United States Patent
Miyaki et al.

(10) Patent No.: US 7,375,883 B2
(45) Date of Patent: May 20, 2008

(54) LENS SHEET, TRANSMISSION TYPE SCREEN, AND REAR PROJECTION TYPE DISPLAY

(75) Inventors: Yukio Miyaki, Kanagawa (JP); Hiroyuki Kiso, Miyagi (JP); Yumi Haga, Miyagi (JP); Tsutomu Nagahama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/563,430

(22) Filed: Nov. 27, 2006

(65) Prior Publication Data
US 2007/0121207 A1    May 31, 2007

(30) Foreign Application Priority Data
Nov. 28, 2005    (JP) ............... 2005-341463

(51) Int. Cl.
G03B 21/60    (2006.01)
G03B 21/56    (2006.01)
G02B 27/10    (2006.01)

(52) U.S. Cl. .............. 359/457; 359/460; 359/620

(58) Field of Classification Search ........ 359/443, 359/455–457, 619–620
See application file for complete search history.

(56) References Cited

U.S. PATENT DOCUMENTS

| | | | |
|---|---|---|---|
| 6,650,471 B2 | 11/2003 | Doi | |
| 6,801,372 B2 | 10/2004 | Doi | |
| 2003/0081311 A1 | 5/2003 | Doi | |
| 2004/0125465 A1 | 7/2004 | Doi | |
| 2006/0187545 A1 | 8/2006 | Doi | |
| 2006/0203332 A1* | 9/2006 | Shimotsuma et al. | 359/455 |

FOREIGN PATENT DOCUMENTS

| | | |
|---|---|---|
| JP | 2001-228549 | 8/2001 |
| JP | 2003-084101 | 3/2003 |
| JP | 2005-503578 | 9/2003 |
| JP | 2003-313445 | 11/2003 |
| JP | 2005-049795 | 2/2005 |
| JP | 2005-503578 | 2/2005 |

\* cited by examiner

*Primary Examiner*—Christopher Mahoney
(74) *Attorney, Agent, or Firm*—Bell, Boyd & Lloyd LLP (57) ABSTRACT

A lens sheet, transmission screen, and a rear projection display are provided. The lens sheet includes fly-eye lens elements periodically arranged on one side of a transparent base, wherein the lens elements are composed of a UV-curing type resin, and the storage elastic modulus at a reference temperature of 25° C. and a frequency of $10^{-6}$ Hz, in a master curve obtained from measurement of dynamic viscoelasticity of the resin, ranges from $1 \times 10^7$ Pa to $1 \times 10^9$ Pa.

8 Claims, 6 Drawing Sheets

LENS SHEET, TRANSMISSION TYPE SCREEN, AND REAR PROJECTION TYPE DISPLAY

CROSS REFERENCES TO RELATED APPLICATIONS

The present application claims priority to Japanese Patent Application JP 2005-341463 filed with the Japanese Patent Office on Nov. 28, 2005, the entire contents of which being incorporated herein by reference.

BACKGROUND

The present application relates to a lens sheet which is preferable for use as, for example, a transmission type screen for a rear projection television set, to a transmission type screen using the lens sheet, and to a rear projection type display using the transmission type screen.

In recent years, there has been a rapid spread of rear projection television sets (rear projection type displays) in which picture light modulated by a liquid crystal display, a digital mirror device or the like is displayed by projecting onto a transmission type screen while being enlarged by projection means such as a projection lens. In use of the rear projection television set, the picture light is transmitted through a screen to form an image in the vicinity of the front surface of the screen, and the image-forming picture light is recognized by a viewer from the front side of the system.

The transmission type screen for the rear projection television set has two sheet-like members which are disposed proximate to each other, with an appropriate spacing therebetween. One of the sheet-like members is a lenticular lens sheet having a lens array on the rear side thereof, and the other is a Fresnel lens which is formed with a Fresnel lens on the front side thereof and disposed to face the rear side (lens-formed surface) of the lenticular lens sheet.

The lenticular lens sheet has a structure in which a lens layer formed of a UV-curing type resin is laminated on a transparent plastic base of polyethylene terephthalate or the like. On the other hand, the Fresnel lens sheet is generally composed of a glass or an injection molded body of a transparent synthetic resin material such as an acrylic resin, a polycarbonate resin, etc.

Meanwhile, in the rear projection television screen, if the spacing between the two sheet-like members is too large, the formed image would be blurred to be a double image, and the picture would be distorted or become obscure. Therefore, it is ideal that the lenses of the sheet-like members are in contact with each other at central portions thereof.

In view of this, one or both of the sheet-like members, for example the lenticular lens sheet is preliminarily formed in a cambered state. The lenticular lens sheet in the cambered state is laid on the Fresnel lens sheet serving as the other sheet-like member, then a pressure is so exerted that the peripheral edge portions of the lenticular lens sheet is laid just on the peripheral edge portions of the Fresnel lens sheet, and the peripheral edge portions of both the sheets are fixed. With the peripheral edge portions of both the sheet-like members fixed integrally, the spacing between the lenticular lens sheet and the Fresnel lens sheet can be prevented from being too large.

However, the pressing of the lens-formed surfaces of the lenticular lens sheet and the Fresnel lens sheet against each other may lead to deformation of the lens elements on the lenticular lens sheet side. The deformation of the lens elements, if occurred, would lead to a change or changes in optical characteristics, whereby the optical path of the outgoing light may be changed, the image formed may be blurred, and the picture may be distorted or become obscure.

Besides, even in the case where the contact pressure between the lens elements is not so strong as to cause deformation of the lenticular lens sheet, upon a situation where vibration is continuingly applied to the system, as for example during transportation, the induced contact between the lens elements may cause friction and marring on the surface of the lenticular lens sheet, and the image displayed may be turned into a double or triple image due to the mars.

In order to solve such a problem, there have been made various proposals as to improvements in the resin composition constituting the lenticular lens sheet. It has been found, however, that the performances obtained according to the proposals are insufficient for the performance required of the fly-eye lens (one of lenticular lenses) attracting attention in recent years.

To be more specific, Japanese Patent Laid-open No. 2005-49795 describes a lens sheet composed of a thermoplastic resin wherein universal hardness, compressive modulus, and dissipation factor are specified. However, since a thermoplastic resin is used, this configuration is unsatisfactory from the viewpoint of precise shape reproduction and thermal strain. Besides, in Japanese Patent Laid-open No. 2003-313445 and JP-A-2005-503578, a resin composition for an optical element is disclosed which has a specified creep deformation coefficient and a specified compressive modulus. However, these indices have been unsatisfactory in terms of correspondence with the deformation in the case where a low level of pressure is exerted for a long period of time.

On the other hand, Japanese Patent Laid-open No. 2003-84101 discloses a technique of determining the relationship between the dissipation factor of a resin composition and temperature and specifying a range of peak width. However, this is also insufficient in terms of correspondence with the deformation in the case where a low level of pressure is applied for a long period of time. Further, Japanese Patent Laid-open No. 2001-228549 discloses a lens sheet which has a specified dissipation factor of dynamic viscoelasticity and a specified coefficient of dynamic friction. However, these indices pertain to frictional wear, and it is impossible to define the correspondence thereof with the deformation in the case where a low level of pressure is exerted for a long period of time.

In the case of a cylindrical lens conventionally used as a lenticular lens, the portions of contact thereof with a Fresnel lens are a plurality of line form portions. On the other hand, in the case of a fly-eye lens, the portions of contact are a plurality of spot form contact portions, and the area of contact is smaller. Therefore, the pressure exerted on the lens element is greater in the case of the fly-eye lens than in the case of the cylindrical lens. Accordingly, the pressure resistance and mar resistance performances required of a fly-eye lens are higher than those required of a cylindrical lens. However, it has been found as a result of the present inventors' research that the physical properties disclosed in Patent Documents described above cannot insure long-term properties as well as short-term properties.

SUMMARY

There is a need for a lens sheet which is a lenticular lens sheet with a lens surface composed of a fly-eye lens, for example, and which can obviate deformation of lens elements due to contact with a Fresnel lens and marring due to vibrations, a transmission type screen using the lens sheet, and a rear projection type display using the transmission type screen.

According to an embodiment, there is provided a lens sheet including lenticular lens elements periodically arranged on at least one side of a transparent base, wherein the lens elements are composed of a UV-curing type resin, and the storage elastic modulus at a reference temperature of 25° C. and a frequency of $10^{-6}$ Hz, in a master curve obtained from measurement of dynamic viscoelasticity of the resin, is in the range of $1 \times 10^7$ to $1 \times 10^9$ Pa.

By forming the lens elements from a UV-curing type resin having such physical properties, it is possible to obtain a lens sheet having stable properties with no deformation or marring under a load exerted thereon for a long period of time. This makes it possible to enhance the pressure resistance and mar resistance performances of a fly-eye lens sheet having fly-eye lenses two-dimensionally arranged at a pitch of not more than 200 µm and a lens height of not more than 100 µm, for example, and to maintain the desired performances for a long period of time.

When the lens sheet configured as above is applied as a lenticular lens sheet in a transmission type screen for a rear projection type display, the lens sheet can be restrained from deformation or marring (flawing) due to contact thereof with a Fresnel lens sheet, and, therefore, clear images free of blurring of images formed by picture light can be displayed.

As has been mentioned above, according to the lens sheet in an embodiment, it is possible to obviate the deformation of lens elements and flawing due to vibration or the like. It is also possible to display clear images, when the lens sheet is used as a transmission type screen for a rear projection type display.

Additional features and advantages are described herein, and will be apparent from, the following Detailed Description and the figures.

DETAILED DESCRIPTION

Now, an embodiment will be described below referring to the drawings. In the following embodiment, an example of application of the present invention to a fly-eye lens sheet serving as a lenticular lens sheet will be described.

Figure 1A:
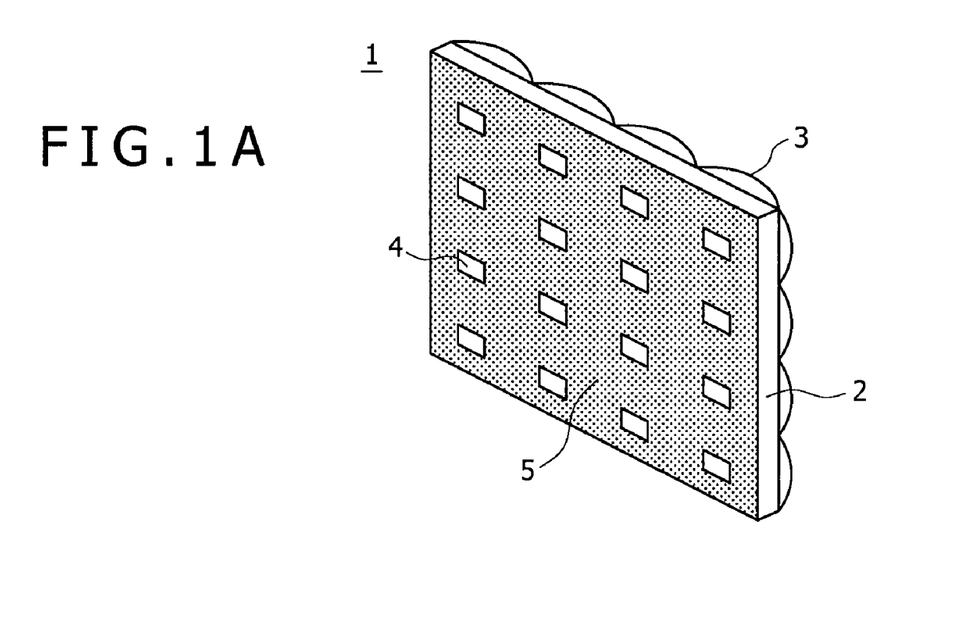
FIGS. 1A and 1B are perspective views each showing a schematic configuration of a fly-eye lens sheet 1 according to an embodiment.
Figure 1B:
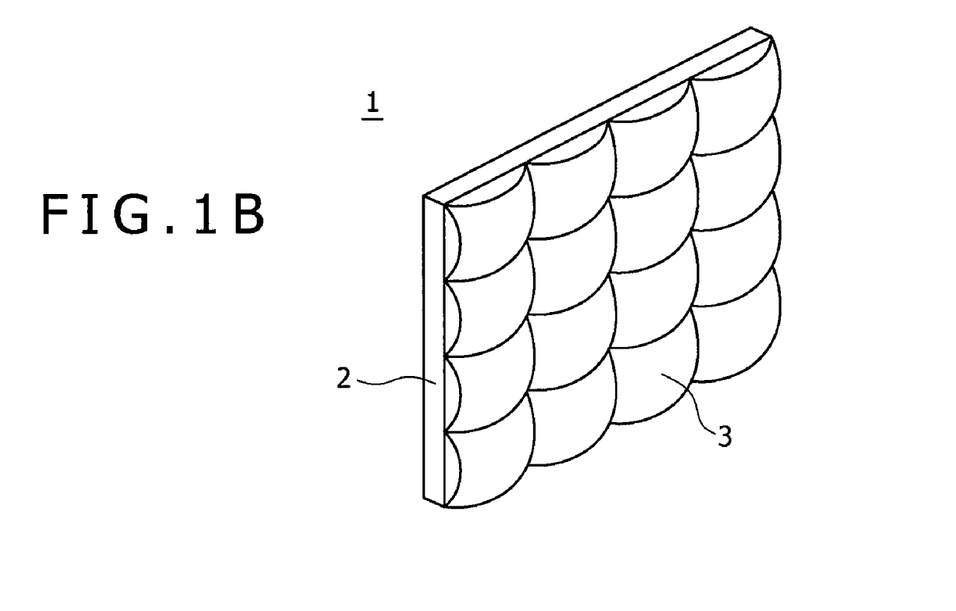

FIGS. 1A and 1B are perspective views showing a schematic configuration of a fly-eye lens sheet 1 according to an embodiment of the present invention. The fly-eye lens sheet 1 has a lens surface in which fly-eye lens elements (hereinafter referred to as "lens elements") 3 composed of a UV-curing type resin are two-dimensionally periodically arranged on one side of a sheet-like transparent base 2. The other side of the transparent base 2 is a flat surface, which is provided with a light shielding layer 5 having opening portions 4 at locations facing the light condensing portions of the lens elements 3.

The shape, size, pitch and the like of the lens elements 3 are not particularly limited. In this embodiment, the lens elements 3 are tetragonal in plan-view shape, and are formed to have a pitch of not more than 200 µm and a lens height of not more than 100 µm. In addition, the lens elements 3 may have spherical or non-spherical surfaces.

Figure 2A:
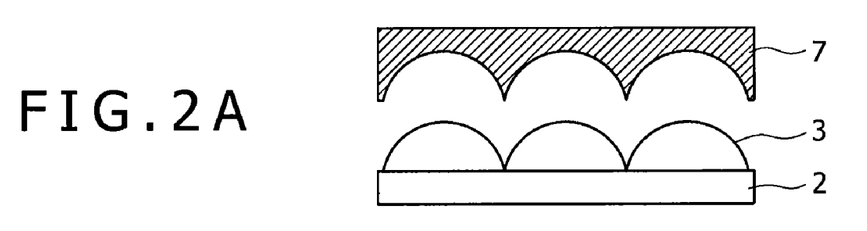
FIGS. 2A to 2C are step diagrams for illustrating a method of manufacturing the fly-eye lens sheet 1.

FIGS. 2A to 2C are step diagrams for illustrating a method of manufacturing the fly-eye lens sheet 1 configured as above. First, as shown in FIG. 2A, the UV-curing type resin is made to flow into a mold having shapes reverse to the fly-eye lenses composed of predetermined recesses and projections, and thereafter the transparent base 2 is put thereon. Then, the UV-curing type resin is cured by irradiation with UV rays from the upper side of the transparent base 2, followed by demolding, to produce the lens elements 3 on one side of the transparent base 2.

The method of producing the lens elements 3 is not particularly limited. The lens elements 3 can be produced by use of a master which is produced by utilizing such techniques as cutting, shaping of a resist by use of a liquid crystal exposure technique, a mask imaging technique using an excimer laser, etc.

The UV-curing type resin constituting the lens elements 3 is not particularly limited, insofar as the resin is light-transmitting and has a predetermined dynamic viscoelasticity which will be described later. It should be noted here, however, that changes in the hue of the transmitted light or in the amount of transmitted light due to coloration or haze are undesirable. Preferable examples of the UV-curing type resin include acrylate based resins such as urethane acrylate, epoxy acrylate, polyester acrylates, polyol acrylates, polyether acrylates, melamine acrylate, etc.

The UV-curing type resin in an embodiment may be admixed with light stabilizer, UV absorber, antistatic agent, flame retarder, antioxidant, etc., as required. A hard coat layer for enhancing mar resistance or a reflection preventive layer for reducing the loss of light due to reflection may further be provided on the UV-curing type resin.

Incidentally, examples of a curing energy source include electron beams, UV rays, visible rays, and gamma rays, of which the UV rays are preferred from the viewpoint of productive facilities. Further, the source of UV rays is not particularly limited, and a high pressure mercury lamp, a metal halide lamp or the like may be used appropriately.

The cumulative irradiation amount of UV rays can be appropriately selected so that curing of the resin used and adhesion thereof to the transparent base 2 are achieved satisfactorily and that yellowing of the resin or the transparent base 2 would not occur. The atmosphere for irradiation can be appropriately selected according to the situation of the curing of the resin; thus, the irradiation may be conducted in air or in an inert atmosphere such as nitrogen, argon and the like.

On the other hand, as the material constituting the transparent base 2, known polymeric base materials can be used. Preferable examples of the polymeric base materials include sheets and films of polyester resins such as polyethylene terephthalate, and the like, polyolefin resins such as polypropylene, and the like, polycarbonate resins, vinyl chloride resin, polyimides, polyamides, aramides, triacetyl cellulose, and so on.

The thickness of the transparent base 2 is preferably in the range of 20 to 200 μm. A thickness of less than 20 μm leads to an insufficient strength, whereas a thickness of more than 200 μm results in worsening of handlability in production. In the latter case, further, the lens focus is located in the base, thereby worsening the picture quality. In order to enhance the adhesion of the transparent base 2 with the lens elements 3, an easily adhesive layer may be provided on the surface of the transparent base 2, or the surface may be subjected to any of various surface treatments such as a corona discharge treatment, a plasma treatment, etc.

Figure 2B:
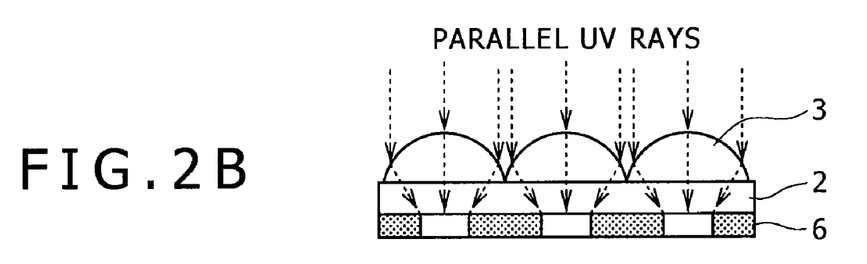

Next, as shown in FIG. 2B, a photosensitive tacky layer 6 is formed on the other side of the transparent base 2. Examples of the method of forming the photosensitive tacky layer 6 include a method of directly applying a photosensitive tacky material to the transparent base 2, and a method in which a photosensitive tacky layer preliminarily formed on a support base having a mold release effect is laminated on the transparent base 2.

In this embodiment, the photosensitive tacky layer 6 is composed of a positive type UV-curing photosensitive tacky material which looses tackiness upon exposure. Then, irradiation with collimated UV rays is conducted from the side, where the lens elements 3 are formed, of the transparent base 2. The UV rays of irradiation are condensed by the lens elements 3, and specified portions (light condensation portions) of the photosensitive tacky layer 6 are exposed to the UV rays, thereby loosing the tackiness. As a result, the photosensitive tacky layer 6 is provided with a pattern composed of non-tacky portions and tacky portions.

Here, the photosensitive tacky layer 6 contains, as a main component, a tacky binder comprised of at least one organic polymer, a photopolymerizable compound having an ethylenical unsaturation, and at least one photopolymerization initiator.

The tacky binder comprised of the organic polymer is desirably compatible with the above-mentioned components. General examples of the organic polymer include polyvinyl chloride, poly(meth)acrylic acid, poly(meth)acrylic acid esters, polyvinyl ether, polyvinyl acetal, polyurethane resin, epoxy resin, polyamides, polyesters, vinylidene chloride-acrylonitrile copolymer, vinylidene chloride-methacrylate copolymer, vinylidene chloride-vinyl acetate copolymer, cellulose derivatives, polyolefins, diallyl phthalate resin, and various synthetic rubbers, for example, butadiene-acrylonitrile copolymer.

As the photopolymerization initiator, addition-polymerizable or cross-linkable known monomers and oligomers having a radical polymerizable ethylenic unsaturation can be used without limitations. Examples of these are monomers and oligomers having a vinyl group or an acryl group, or polymers having an ethylenically unsaturated group at a terminal thereof or in a side chain. Examples of these include acrylic acid and its salts, acrylic acid esters, acrylamides, methacrylic acid and its salts, methacrylic acid esters, methacrylamides, maleic anhydride, maleic acid esters, itaconic acid esters, styrenes, vinyl ethers, vinyl esters, N-vinyl heterocycles, acryl ethers, acryl esters, and derivatives of these. These compounds may be used either singly or in combination of two or more of them.

Figure 2C:
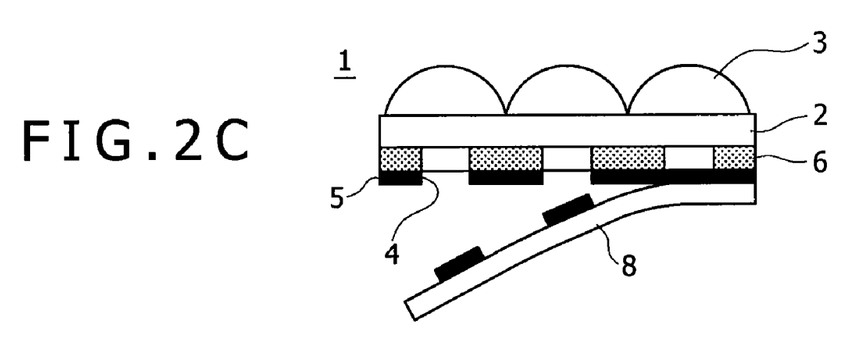

Subsequently, a light-shielding layer 5 is formed on the photosensitive tacky layer 6. In forming the light-shielding layer 5, as shown in FIG. 2C, the black layer (light-shielding layer) side of a black transfer film having a black layer (light-shielding layer) supported on a support base 8 is laminated on the photosensitive tacky layer 6. After pressing, the support base 8 is peeled off. As a result, a light-shielding pattern is formed in which the black layer is transferred onto to the tacky portions of the photosensitive tacky layer 6 and in which the regions corresponding to the non-tacky portions are opened.

As will be described later, the light-shielding layer 5, located on the viewing side of the screen, has the function of preventing the reflection of external light and thereby enhancing the contrast of the picture, in the case where the lens sheet 1 is used as a transmission type screen in a rear projection type display. Image-forming light passes through the opening portions 4 of the light shielding layer 5. The shape of the opening portion 4 is determined according to the form of the lens element 3; in this embodiment, the shape is a tetragonal shape (see FIG. 1A).

The black layer of the black transfer film for constituting the light shielding layer 5 is obtained by a method in which a coating material prepared by mixing a binder resin with a black pigment such as carbon black is applied to the support base 8. In addition to the carbon black and the binder resin, the black layer may contain additives such as an organic pigment, an inorganic pigment, a UV absorber, and the like, as required.

The thickness of the black layer, or the light shielding layer 5, is preferably in the range of 0.5 to 2.0 μm. A thickness below 0.5 μm leads to a lowering in the black color density, with the result that external light cannot be shielded sufficiently; in addition, it leads to conspicuous unevenness of density, which is undesirable. On the other hand, a thickness in excess of 2.0 μm leads to cracking of the coating film when the black transfer layer is laminated on and pressed against the photosensitive tacky layer 6, which situation is undesirable. The thickness of the black layer is most preferably in the range of 0.7 μm to 1.2 μm.

Incidentally, as the support base, a known plastic film can be used. If necessary, a mold release layer may be formed on the surface of the plastic film so as to regulate the peel strength between the plastic film and the black layer.

Figure 3:
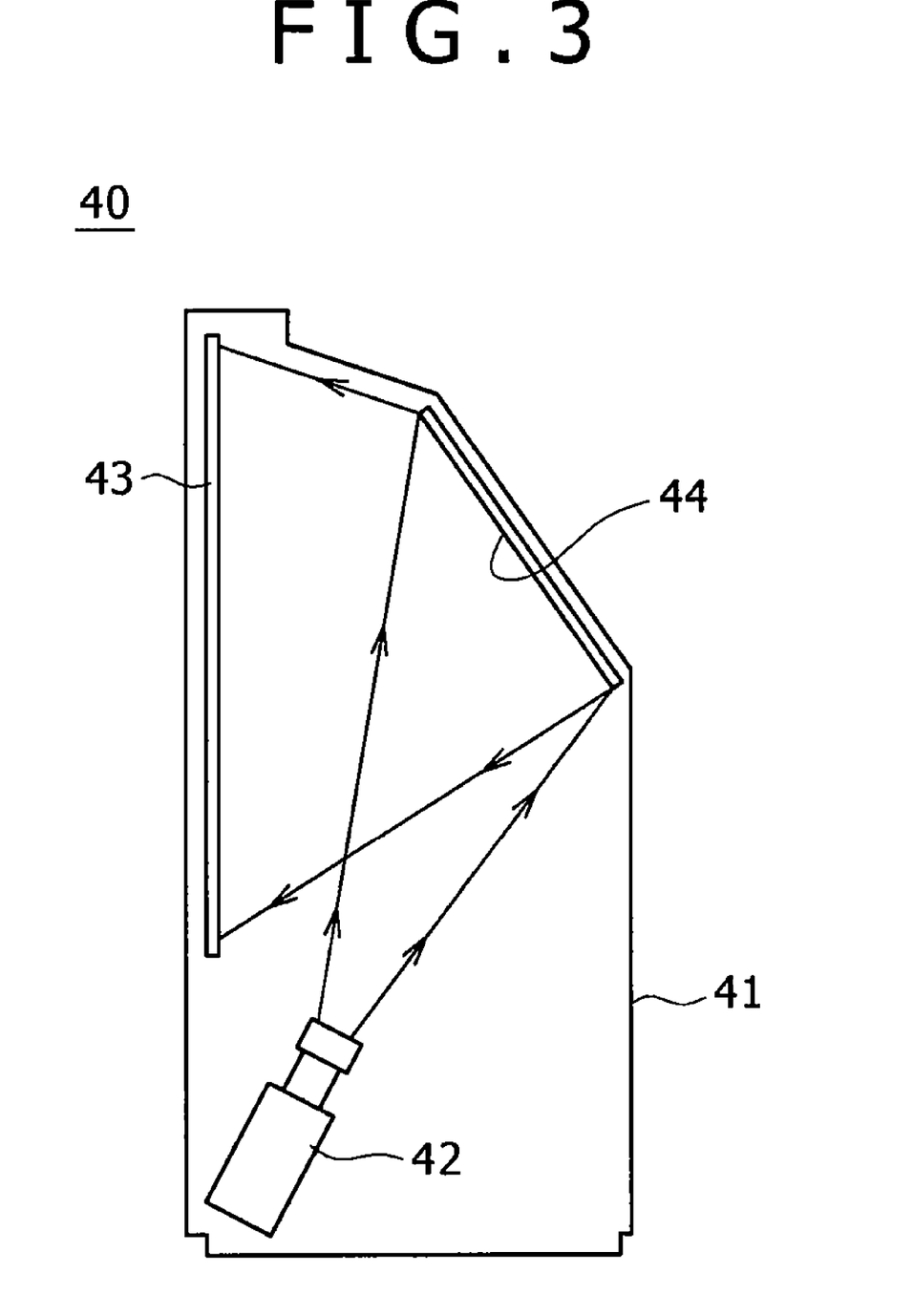
FIG. 3 is a schematic configuration diagram of a rear projection type display 40.

The lens sheet 1 in this embodiment which is produced as above-mentioned is used for a screen unit 43 of a rear projection type display 40 shown in FIG. 3. The screen unit 43 corresponds to the transmission type screen in the present invention.

Figure 4:
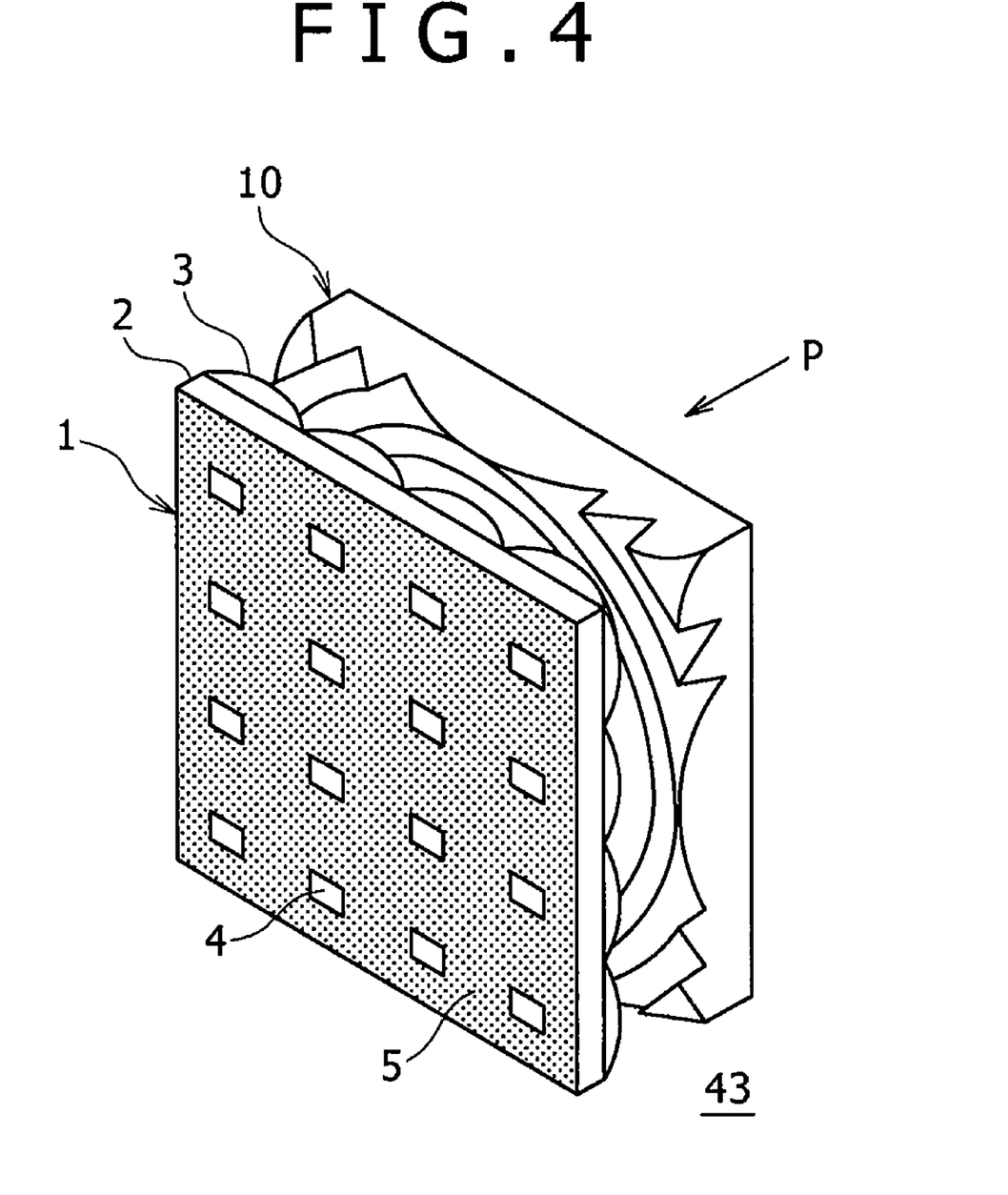
FIG. 4 is a schematic configuration diagram of a screen unit applied to the rear projection type display 40.
Figure 5A:
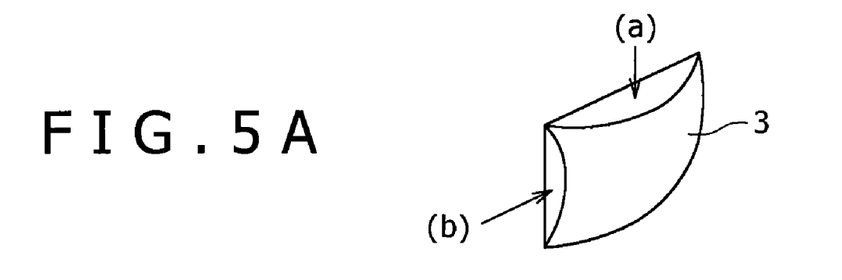
FIGS. 5A to 5D are diagrams for illustrating a configuration of a fly-eye lens element for describing a working example according to an embodiment.
Figure 5B:
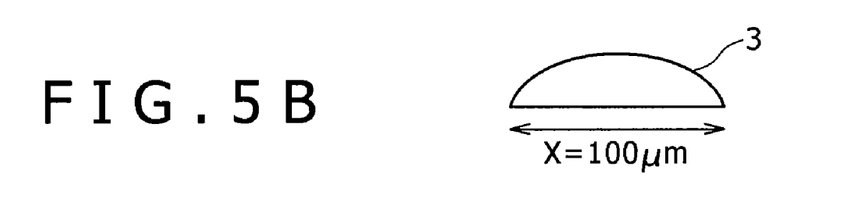
Figure 5C:
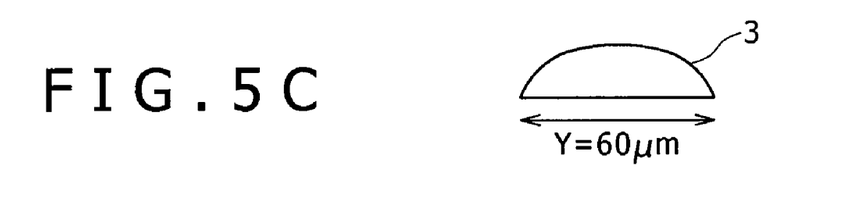
Figure 5D:
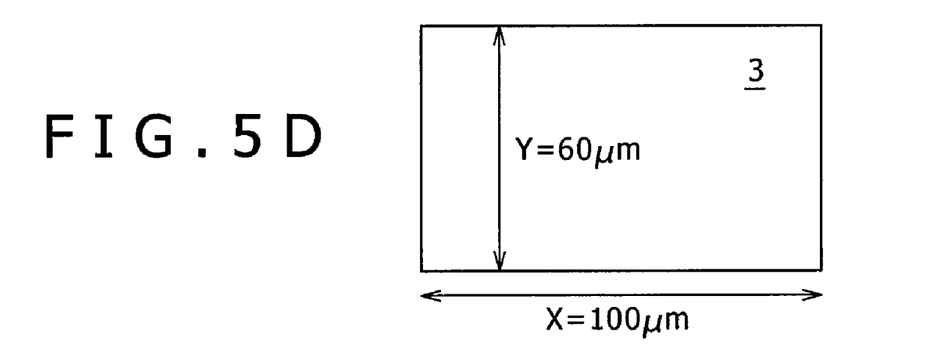

As shown in FIG. 3, the rear projection type display 40 has a configuration in which a picture projection source 42 and a reflector 44 for reflecting picture light, projected from the picture projection source 42, toward the screen unit 43 at the front of a main body 41 are provided in the inside of the main body 41. As shown in FIG. 4, the screen unit 43 is composed of a Fresnel lens sheet 10, and a fly-eye lens sheet 1 as the lenticular lens sheet.

In the screen unit 43, the Fresnel lens sheet 10 converts the picture light (indicated by arrow P), reflected from the reflector 44, into parallel rays, and causes the parallel rays to go out to the fly-eye lens sheet 1. The lens element 3 of the fly-eye lens sheet 1 face the lens-formed side of the Fresnel lens sheet 10. The light going out of the Fresnel lens sheet 10 is transmitted through the lens elements 3 and is diffusedly emitted through the opening portions 4 of the fly-eye lens sheet 1, to form an image on the screen front surface.

The Fresnel lens sheet 10 and the fly-eye lens sheet 1 face each other while being located proximate to or in contact with each other. If the spacing between the sheets is too large, the image formed would be blurred into a double image, and the picture would be obscure. Therefore, integration of the sheets is contrived by exerting a certain pressure so as to press the sheets toward each other. In this instance, there is the possibility that the lens elements 3 of the fly-eye lens sheet 1 might be deformed, or their surfaces might be scratched or marred, due to the contact with a lens structure part (shown in the figure) of the Fresnel lens sheet 10. In such a case, the image formed by the picture light would be blurred, and the picture would be obscure.

Taking this problem into consideration, in this embodiment, the pressure resistance and mar resistance performances of the lens elements 3 of the fly-eye lens sheet 1 are enhanced, whereby deformation or marring of the lens elements 3 due to the contact with the Fresnel lens sheet 10 is restrained, and the picture is prevented from becoming obscure.

Specifically, the lens elements 3 of the fly-eye lens sheet 1 in this embodiment are comprised of a UV-curing type resin, and, in a master curve obtained from measurement of dynamic viscoelasticity of the resin, the storage elastic modulus at a reference temperature of 25° C. and a frequency of $10^{-6}$ Hz is in the range of $1 \times 10^7$ to $1 \times 10^9$ Pa, preferably $5 \times 10^7$ to $1 \times 10^9$ Pa.

If the storage elastic modulus at a reference temperature of 25° C. and a frequency of $10^{-6}$ Hz is less than $1 \times 10^7$ Pa, the lens elements 3 would be too soft and be deformed or marred conspicuously, so that when the fly-eye lens sheet 1 is applied to a transmission type screen, the image would be distorted and become obscure. On the other hand, if the storage elastic modulus at a reference temperature of 25° C. and a frequency of $10^{-6}$ Hz exceeds $1 \times 10^9$ Pa, the lens elements 3 would be too hard and be cracked at the time of demolding, so that the lens elements 3 cannot be formed appropriately on the transparent base 2.

Here, the measurement of dynamic viscoelasticity means a test method in which a stress or strain at a frequency ω is given to a specimen and the corresponding strain or stress is measured. The modulus of elasticity (elastic modulus) defined as the ratio between stress and strain in this case is a function of the frequency ω and is a complex number, of which the real part is referred to as storage elastic modulus, and the imaginary part to loss elastic modulus.

In general, a polymer material behaves to be harder at a higher frequency when subjected to the measurement at a given temperature, and behaves to be harder at a lower temperature when subjected to the measurement at a given frequency (time scale). The fact that, when a measured value at a temperature is reduced (converted) into a frequency (time) according to the temperature, the reduced value coincides with the result of measurement at another temperature, is known as the time-temperature conversion rule. This ensures that, by measuring the frequency dispersion while varying the temperature in the measurement, substituent values for values at such a low frequency or such a high frequency as to make experiments impossible can be obtained. A curve obtained by synthesizing the results of observation in a narrow range into the results in a wide range by utilizing the time-temperature conversion rule is called a master curve.

The master curve of storage elastic modulus in the present invention can be obtained from dynamic viscoelasticity measurement conducted for 50 to 200 μm-thick resin films in a 0.1% strain restriction tensile mode, with temperature varied from −50 to 200° C. (frequency range: 0.1 to 100 Hz).

In the fly-eye lens sheet in this embodiment configured as above-described, stable properties attended by no deformation or marring under a load exerted for a long period of time can be obtained. This makes it possible to enhance the pressure resistance and mar resistance performances of a fly-eye lens sheet having fly-eye lens elements periodically arranged two-dimensionally at a fine pitch, and to maintain the desired performances of the fly-eye lens sheet for a long period of time.

In addition, by applying the fly-eye lens sheet 1 configured as above as a transmission type screen for a rear projection type display 40, the fly-eye lens sheet 1 can be restrained from being deformed or marred due to the contact thereof with the Fresnel lens sheet, so that it is possible to display a clear image free of distortion of picture light or blurring of the image formed.

On the other hand, as above-mentioned, the molding of the UV-curing type resin is conducted by a method in which the uncured UV-curing type resin is charged onto a mold formed of a metal or the like, the charged resin is covered by the transparent base put thereon, the resin is cured by irradiation with UV rays, and the molded resin and the transparent base are released from the mold. In the case where the cured UV-curing type resin is not demolded but left in the mold due to some trouble in operation, it is necessary to remove the resin without damaging the mold. In this case, since mechanical removal of the remaining resin may damage the mold, the remaining resin is chemically removed by use of a solvent or the like. Conventionally, removal of a UV-curing resin has been conducted by use of a halogen-based solvent containing chlorine or bromine, for example, dichloromethane. However, since this kind of halogen-based solvents exert heavy loads on environments, their use must be restrained.

On the contrary, in this embodiment, the use of the UV-curing type resin having the dynamic viscoelasticity characteristic as above-mentioned ensures that the attached resin left in the mold can be removed by a non-halogen based solvent such as acetone and methyl ethyl ketone. This makes it possible to carry out a mold cleaning work without exerting a vast load on environments.

EXAMPLES

Examples are provided below according to an embodiment.

First, a fly-eye lens sheet having a structure in which lens elements 3 shaped as shown in FIGS. 5A to 5D are periodically arranged two-dimensionally was produced following the procedure described below.

By a mask imaging method using an excimer laser, the inside surface of a hollow cylindrical polycarbonate base material was processed to form non-spherical fly-eye lens shapes having pitches of 60 μm (in the Y direction) and 100 μm (in the X direction) and a depth of 50 μm. With the thus processed base material as a master, a nickel layer was formed by conducting electroless plating as a surface conductivity-imparting treatment, and then nickel electroforming was conducted, to produce a mold having a mold cavity at the outer surface of a hollow cylinder.

Each of various UV-curing type resins (ARONIX, produced by Toagosei Co., Ltd.) having storage elastic modulus values given in Table 1 was made to flow into the mold thus produced, then a 50 μm-thick polyethylene terephthalate (PET) film (product code: A4300, produced by Toyobo Co., Ltd.) was placed thereon, and the resin thickness was uniformized by applying a load of 9.8 N (1 kgf) with a rubber roller so that the thickness of the fly-eye lens elements would be even. The UV-curing resin was cured by irradiation with UV rays at 1000 mJ/cm$^2$ from above the PET film, to produce a fly-eye lens sheet.

Next, a photosensitive tacky agent (produced by Toagosei Co., Ltd.) was applied to the flat surface of the fly-eye lens sheet produced above, and irradiation with UV parallel rays (300 mJ/cm$^2$) was conducted from the lens side, to form a fine pattern of tacky portions and non-tacky portions.

Subsequently, a black transfer film was applied to the photosensitive tacky surface side of the fly-eye lens sheet. The black transfer film was peeled from the fly-eye lens sheet, leaving the black layer only on the tacky portions of the photosensitive tacky agent, to form a light-shielding layer. The fly-eye lens sheet thus obtained was adhered to a diffuser plate of 15 cm by 15 cm in size, with the transparent tacky agent therebetween.

<Long-term Lens Collapse Test>

The fly-eye lens sheet of 15 cm by 15 cm in size produced as above was so held that its lens surface face the lens surface of a Fresnel lens sheet (15 cm by 15 cm) of the same kind as a Fresnel lens sheet provided for a projection television set "KDF-60HD900", a product by Sony Corp., and a load of 100 g was exerted thereon. After the assembly was held in the loaded condition at 25° C. for one month, it was mounted in a rear projection television set prepared for experiment, and the image displayed was observed. The results are shown in Table 1.

Lens Mar Resistance Test>

A 1 cm$^2$ piece of the fly-eye lens sheet produced above was subjected to 100 reciprocation sliding test at 100 mm/min against the surface of a Fresnel lens on a surface property tester TRIBOGEAR, a product by HEIDON (Shinto Scientific Co., Ltd.), under a load of 200 g. After the test, the marred state of the lens surface was observed. The results are shown in Table 1.

<Measurement of Master Curve>

Figure 6:
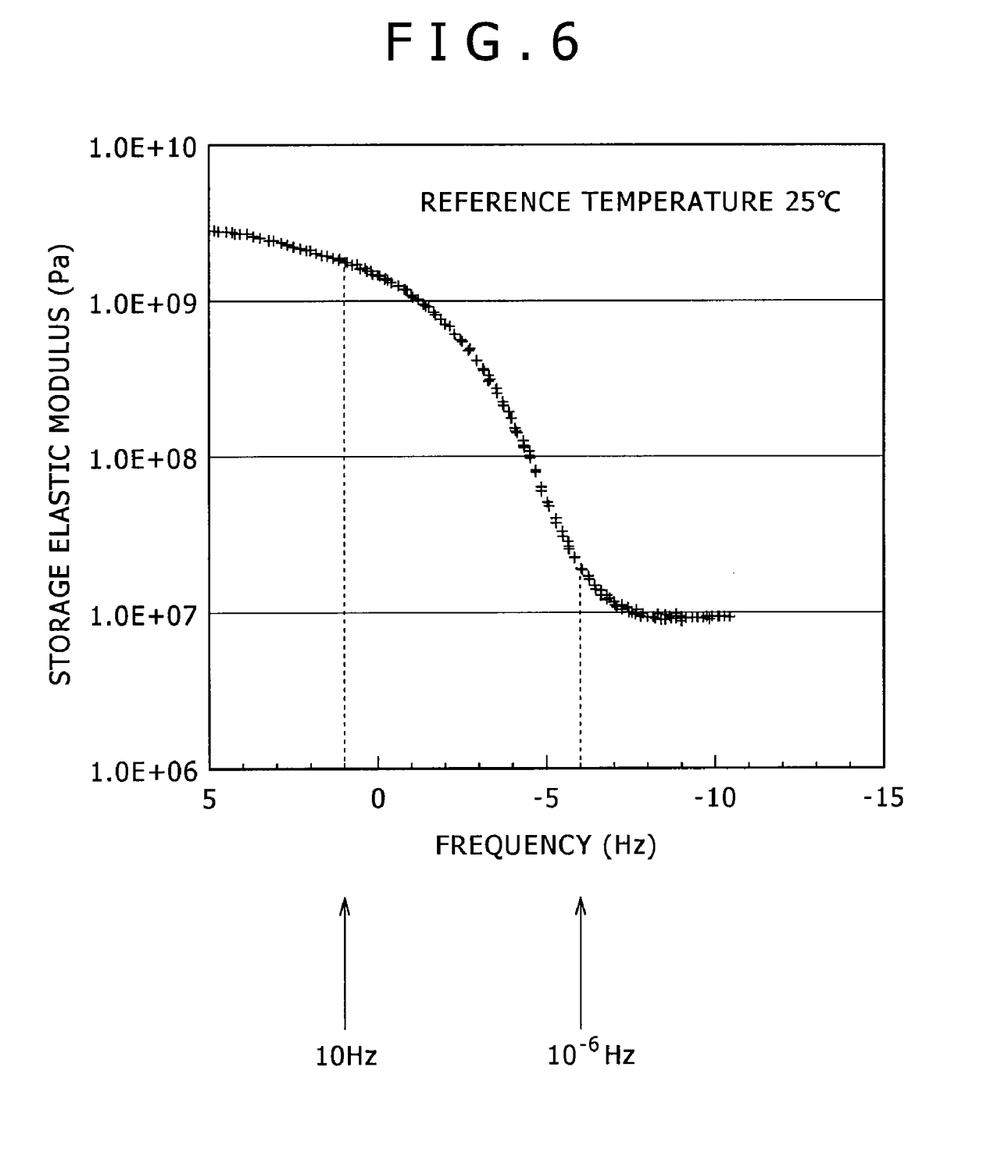
FIG. 6 is a diagram showing an example of a master curve of a UV-curing type resin used in the working example according to an embodiment.

A 100 μm-thick film of a UV-curing type resin was cured by irradiation with UV rays at a cumulative irradiation amount of 1000 mJ/cm$^2$ by use of a metal halide UV irradiation apparatus (a product by Eye Graphics Co., Ltd.), and the cured film was blanked into a rectangular shape of 5 mm by 50 mm. Next, the film thus obtained was set on a dynamic viscoelasticity measuring apparatus, a product by I. T. Keisoku Seigyo KK, and a test in a 0.1% strain restriction tensile mode was conducted, with temperature varied from −50 to 200° C. (frequency range: 1 to 100 Hz). The storage elastic modulus at a reference temperature of 25° C. and a frequency of $10^{-6}$ (10E-6) Hz was obtained. One example of the master curve obtained is shown in FIG. 6.

<Attached Resin Cleaning Test>

A 0.1 g portion of each of the UV-curing type resins shown in Table 1 was dropped on the mold produced as above, and the UV-curing type resin was cured by irradiation with UV rays at a cumulative irradiation amount of 20 J/cm$^2$. The mold with the resin left adhered thereto was fed with "BEMCOT" (trade name of a product by Asahi Kasei Fibers Corp.) and methyl ethyl ketone, and it was covered with a PET film. The assembly was left to stand for 60 min while replenishing it with methyl ethyl ketone at a time interval of 5 min, and then "BEMCOT" was removed. After the solvent was evaporated off, it was observed whether or not the resin could be removed by peeling or through conversion into a powder. The results are shown in Table 1.

TABLE 1

|  | Storage viscoelasticity, 25° C., 10 Hz | Storage viscoelasticity, 25° C., 10E−6 Hz | Film Formability | Lens mar resistance | Cleanability of mold stain after film formation | Distortion of image |
| --- | --- | --- | --- | --- | --- | --- |
| Example 1 | 2 × 10E9 Pa | 2 × 10E7 Pa | No problem | No mar | Cleanable | ○ |
| Example 2 | 2 × 10E9 Pa | 4 × 10E7 Pa | No problem | No mar | Cleanable | ○ |
| Example 3 | 2 × 10E9 Pa | 5 × 10E7 Pa | No problem | No mar | Cleanable | ⊙ |
| Example 4 | 2 × 10E9 Pa | 6 × 10E7 Pa | No problem | No mar | Cleanable | ⊙ |
| Example 5 | 2 × 10E9 Pa | 9 × 10E7 Pa | No problem | No mar | Cleanable | ⊙ |
| Example 6 | 2 × 10E9 Pa | 2 × 10E8 Pa | No problem | No mar | Cleanable | ⊙ |
| Example 7 | 2 × 10E9 Pa | 3 × 10E8 Pa | No problem | No mar | Cleanable | ⊙ |
| Example 8 | 3 × 10E9 Pa | 8 × 10E8 Pa | No problem | No mar | Cleanable | ⊙ |
| Comp. Ex. 1 | 2 × 10E9 Pa | 8 × 10E6 Pa | No problem | Marred | Cleanable | X |
| Comp. Ex. 2 | 2 × 10E9 Pa | 2 × 10E9 Pa | Film crack at demold. | Experiment Impossible | Unremovable | Experiment impossible |
| Comp. Ex. 3 | 2 × 10E9 Pa | 3 × 10E9 Pa | Film crack at demold. | Experiment impossible | Unremovable | Experiment impossible |

⊙: No distortion was recognized.
○: Slight distortion was recognized but was on a practically permissible level.
X: Distortion was on a practically non-permissible level.

As shown in Table 1, under the conditions where the storage elastic modulus at a reference temperature of 25° C. and a frequency of $10^{-6}$ Hz was in the range of $1 \times 10^7$ (1×10E7) to $1 \times 10^9$ (1×10E9) Pa (Examples 1 to 8) in the dynamic viscoelasticity characteristics of the lens elements, no image distortion was recognized or a slight distortion was recovnized but it was on a practically permissible level. Particularly, the conditions where the storage elastic modulus was in the range of 5×10E7 to 1×10E9 Pa (Examples 3 to 8) were preferable, and no distortion was recognized under these conditions.

On the other hand, where the storage elastic modulus was less than 1×10E7 Pa as in Comparative Example 1, an image distortion was recognized, preferably because the lens elements were too soft and were deformed.

As for mar resistance of the lens, as shown in Table 1, under the conditions where the storage elastic modulus at a reference temperature of 25° C. and a frequency of $10^{-6}$ Hz was in the range of $1 \times 10^7$ (1×10E7) to $1 \times 10^9$ (1×10E9) Pa (Examples 1 to 8) in the dynamic viscoelasticity characteristics of the lens elements, no marring was recognized. On the other hand, where the storage elastic modulus was less than 1×10E7 Pa as in Comparative Example 1, marring was recognized, which constitutes a problem on a practical use basis. Besides, where the storage elastic modulus exceeded 1×10E9 Pa, film cracking occurred at the time of demolding of the film and, therefore, the experiment was impossible.

In addition, it is also seen that, where the storage elastic modulus was in the above-mentioned preferable range, film formability of the lens elements was good. Where the storage elastic modulus was in excess of 1×10E9 Pa, the lens elements were too hard, and film cracking occurred at the time of film forming, so that the screen could not be produced (Comparative Examples 2 and 3).

Further, the cleanability of the adhered resin in the mold after film forming was evaluated. Where the storage elastic modulus was in excess of the above-mentioned preferable range, as in Comparative Examples 2 and 3, it was impossible to remove the remaining resin by use of methyl ethyl ketone.

As has been described above, when the lens elements of the fly-eye lens sheet are formed under the conditions where the dynamic elastic modulus at a reference temperature of 25° C. and a frequency of $10^{-6}$ Hz is in the range of $1\times10^7$ (1×10E7) to $1\times10^9$ (1×10E9) Pa in the dynamic viscoelasticity characteristics of the lens elements, a favorable screen free of image distortion can be configured. In addition, excellent film formability is obtained and, therefore, a high productivity is achieved. Further, the adhered resin remaining in the mold can be cleaned away by use of a non-halogen based solvent.

While the embodiment of the present invention has been described above, the invention naturally is not limited to or by the embodiment, and various modifications are possible on the basis of the technical thought of the invention.

For example, while the fly-eye lens sheet was described as an example of the lenticular lens sheet in the above embodiment, the fly-eye lens sheet is not limitative; namely, the present invention is applicable also to other lenticular lens sheets such as a cylindrical lens sheet.

In addition, while the other side surface of the fly-eye lens sheet was formed to be a flat surface in the above embodiment, the lens elements may be arranged also on the other side surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lens sheet comprising lenticular lens elements periodically arranged on at least one side of a transparent base, wherein said lens elements are composed of a UV-curing type resin, and the storage elastic modulus at a reference temperature of 25° C. and a frequency of $10^{-6}$ Hz, in a master curve obtained from measurement of dynamic viscoelasticity of said resin, ranges from $1\times10^7$ Pa to $1\times10^9$ Pa.

2. The lens sheet as set forth in claim 1, wherein said storage elastic modulus ranges from $5\times10^7$ Pa to $1\times10^9$ Pa.

3. The lens sheet as set forth in claim 1, wherein said lens elements are fly-eye lens elements.

4. The lens sheet as set forth in claim 3, wherein said fly-eye lens elements are two-dimensionally arranged at a pitch of not more than 200 μm and a lens height of not more than 100 μm.

5. The lens sheet as set forth in claim 1, wherein the other side of said transparent base is a flat surface.

6. A transmission type screen comprising a first lens sheet and a second lens sheet arranged so that their lens formed sides face each other, wherein a lens element of said first lens sheet is composed of a UV-curing type resin, and the storage elastic modulus at a reference temperature of 25° C. and a frequency of $10^{-6}$ Hz, in a master curve obtained from measurement of dynamic viscoelasticity of said resin, ranges from $1\times10^7$ Pa to $1\times10^9$ Pa.

7. The transmission type screen as set forth in claim 6, wherein said first lens sheet is a lenticular lens sheet, and said second lens sheet is a Fresnel lens sheet.

8. A rear projection type display comprising a transmission type screen having a Fresnel lens sheet and a lenticular lens sheet arranged so that their lens formed sides face each other, wherein lens elements of said lenticular lens sheet composed of a UV-curing type resin, and the storage elastic modulus at a reference temperature of 25° C. and a frequency of $10^{-6}$ Hz, in a master curve obtained from measurement of dynamic viscoelasticity of said resin, ranges from $1\times10^7$ Pa to $1\times10^9$ Pa.

* * * * *